Dec. 16, 1969   J. H. BOYDEN   3,484,717
TORSION PENDULUM Q-SWITCH FOR OPTICAL MASERS
Filed Feb. 16, 1966
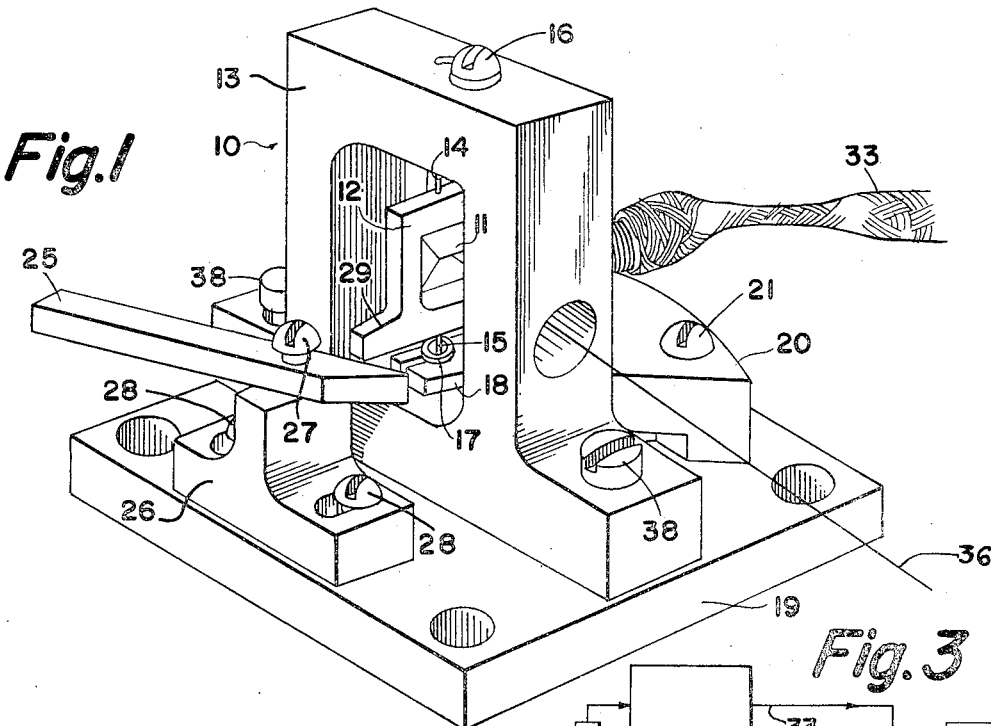
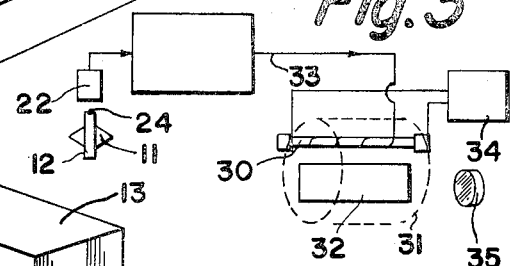
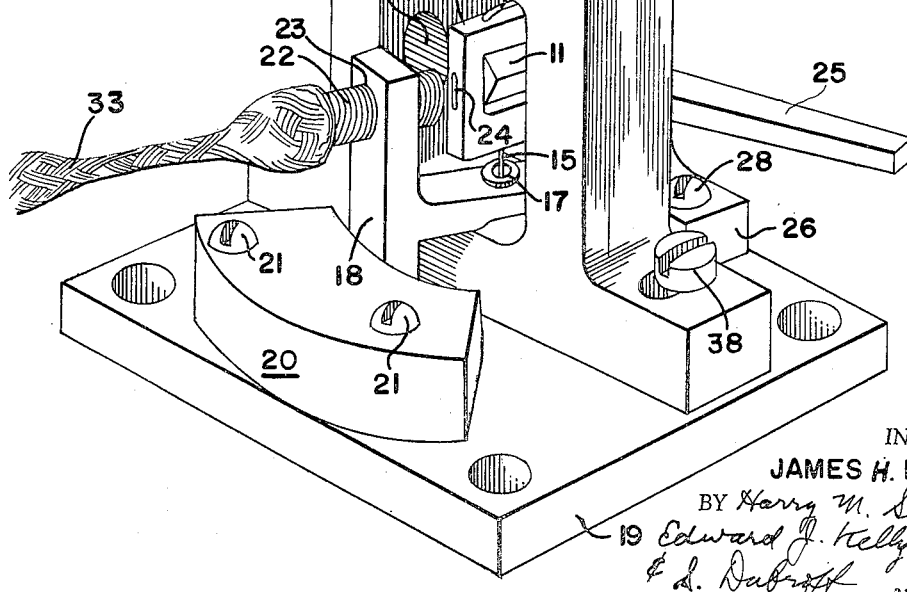
INVENTOR.
JAMES H. BOYDEN
ATTORNEYS

United States Patent Office 3,484,717
Patented Dec. 16, 1969

3,484,717
TORSION PENDULUM Q-SWITCH FOR OPTICAL MASERS
James H. Boyden, Pasadena, Calif., assignor to the United States of America as represented by the Secretary of the Army
Filed Feb. 16, 1966, Ser. No. 529,186
Int. Cl. H01s 3/11
U.S. Cl. 331—94.5         4 Claims

ABSTRACT OF THE DISCLOSURE

A Q-switching device for optical masers including a torsion pendulum rotatably supporting a prism mounted thereon and positioned at one end of an optical cavity. The prism is set into motion by manually deflecting the pendulum to a fixed angle and releasing it.

---

The invention described herein may be manufactured and used by or for the Government for governmental purposes without the payment to me of any royalty thereon.

The present invention relates to a torsion pendulum Q-switch for optical masers and more particularly to a torsion pendulum Q-switch for optical masers which converts the optical energy which usually is emitted from the maser in the form of a series of sporadic pulses into a single, very short pulse whose energy is nearly equal to the total of that in the normal pulse train.

In a laser, there exists competition between the pumping source trying to increase population inversion and laser action trying to decrease it. Thus the population inversion is limited by the laser action itself and power level of the oscillation is restricted.

Q-switching is a process in which the resonance of the Fabry-Perot cavity is controlled in such a way that this competition is largely eliminated. In Q-switching, the system is made non-resonant during the pumping period when the population inversion is increasing, thus enabling the degree of population inversion to be increased far beyond that for an ordinary resonant system. Population inversion goes to a maximum value even in the absence of resonance.

If the system represented by the cavity can be made suddenly resonant, that is, with the high Q at or near the time of this maximum population inversion, the energy stored in its cited levels is stimulated to emit an intense beam of light. This time required for this energy conversion is the output pulse duration and is determined by the amount of energy present and the suddenness with which resonance is approached, that is, by the rate of change of Q. Obviously, if Q is maximized too slowly, the energy will be dissipated before maximum Q is reached. Peak power is determined by the pulse length since the pulse energy is essentially constant and equal to the stored energy.

The most immediate application of the rather recently discovered optical maser (laser) is in the field of range finding or distance measurement. In order to realize the potential of the optical maser it is desirable to convert the optical energy which is usually emitted from the maser in the form of a series of sporadic pulses into a single, very short pulse whose energy is nearly equal to the total of that in the normal pulse train. Quite a number of methods have been proposed and used for this purpose. Almost all of these involve the insertion of an optical loss mechanism in the maser cavity. This loss can be switched off at an appropriate time with respect to the energizing of the pump source and an appreciable fraction of the energy stored in the maser material fluorescence level will be emitted in a single pulse. One of the simplest and generally applicable of these methods is the use of a rotating prism or mirror to close one end of the optical maser cavity. When the reflector comes into parallelism with another, stationary, reflector at the opposite end of the active maser material the optical Q suddenly increases and oscillation commences. The common method of driving this rotating reflector is to use a high speed motor. However, in certain applications weight and power drain are very important factors in the design. It would be very desirable to have a method of Q switching which combined the simplicity of the rotating reflector system with the property of requiring little or no power from electrical sources.

The invention disclosed by this application solves these problems, with the additional feature of increased mechanical ruggedness and insensitivity to severe environmental conditions such as high and low temperatures.

Briefly stated, the present invention involves a Porro prism, which reflects a light beam back on itself in one plane and acts like an ordinary mirror in the perpendicular plane, suspended on a torsion pendulum. The prism is set into rotation by simply deflecting the pendulum to a fixed angle and releasing it quickly. If the constants of the pendulum are properly chosen rotation speeds comparable to those of a high speed motor can be obtained. The high intensity light pulse is generated as the prism rotates through parallelism during the first swing. The parameters which affect the design are: the moment of inertia of the prism, prism holder and torsion wire; the diameter, length and material of the torsion wire; and the rotation rates which are required for proper operation of the Q switched optical maser.

An object of the present invention is the provision of a Q switch that causes the output of an optical maser to consist of a single high power pulse rather than a series of relatively low power pulses.

Another object is to provide a Q switch that causes the output of an optical maser to consist of a single high power pulse rather than a series of relatively low power pulses without the expenditure of electrical power other than that required to operate the optical maser itself.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 shows a diagrammatic view of a preferred form of the invention.

FIG. 2 shows a diagrammatic view of the apparatus shown in FIG. 1 from the opposite side.

FIG. 3 illustrates a schematic of the present invention.

Referring now to the drawings, wherein like reference characters designate like or corresponding parts throughout the several view, there is shown in FIG. 1, which illustrates a preferred embodiment, a torsion pendulum Q-switch 10 including a Porro prism 11, mounted in a prism holder 12 which is rotatably secured to a prism pendulum mounting frame 13 by the use of wires 14 and 15. Wire 14 is secured to frame 13 by a bolt 16. Wire 15 is pivotably mounted in magnetic pickup pivot ring 17 which is carried by magnet pickup mount 18. Magnetic pickup mount 18 is secured on a support plate 19 by clamp 20 which is itself secured to plate 19 by bolts 21. The magnetic pickup 22 is held in hole 23 in close proximity to steel pin 24 in the side of the prism holder 12 at any desired angle. A trigger 25 is moveably secured to trigger mount 26 by bolt 27 which is secured to support plate 19 by bolts 28.

The torsion pendulum Q-switch 10 is actuated, by moving the operating end of trigger 25 against the projection 29, to force prism 11 and prism holder 12 to rotate under the torsion of the supporting wire 14. When a predetermined angle is reached the prism 11 and holder 12 are released. As the prism rotates under the influence of the restoring torque of the wire it passes through an angle, which has been preselected, at which pickup device 22 has been placed. This device senses the passing of the prism holder 12, by means of a small disturbance in a magnetic field, and generates a signal which ignites a flash lamp 30 (FIG. 3) through wire 33 which is in circuit with a lamp power supply 34. Flash lamp 30, which serves as a pump source for the optical maser, is located in an optical pump cavity 31 along with laser rod 32. The prism continues to rotate until it passes through parallelism with the other reflector 35 of the optical maser cavity 31. An optical pulse is thereby generated. The prism 11 continues to rotate through several oscillations, the number depending upon the damping of the torsion pendulum. No further optical pulses will be generated unless the pump source is maintained at sufficient brightness during these oscillations. The line 36 from the laser beam passes through a hole 37 in the side of frame 13 which is secured to plate 19 by bolts 38.

It should be understood of course that the foregoing disclosure relates only to a preferred embodiment of the invention and that it is intended to cover all changes and modifications of the example of the invention herein chosen for the purposes of a disclosure, which do not constitute departures from the spirit and scope of the invention.

I claim:

1. In a device for Q-switching, the combination of an optical cavity, a rotatably mounted prism forming one end of said cavity, a reflector forming the other end of said cavity, said optical cavity containing active optical maser material and a flash lamp, a lamp power supply, and a magnetic pickup in circuit with said optical cavity, said prism being supported in a prism holder which has on one side thereof a steel pin, whereby movement of said pin in proximity to said magnetic pickup generates a signal which causes said lamp power supply to ignite said flash lamp, said prism holder being supported by a pair of wires, one of said wires being secured at one end to said holder, and at the other end to a mounting frame, the other of said wires being secured at one end to said holder and contained at the other end in a ring, said ring being a part of a magnetic pickup mount which is secured in said mounting frame, said magnetic pickup mount being secured to a support plate by a clamp, said clamp being so constructed and arranged that said magnetic pickup can be set at any desired angle with relationship to said prism holder.

2. A device of the type described in claim 1, including means for activating said rotating prism, said means comprising a trigger mount secured to said support plate, and a trigger pivotably secured to said trigger mount.

3. A device of the type described in claim 2, wherein said prism holder has a means thereon for abutment with an operating end of said trigger to initiate the movement of said prism.

4. In a device for Q-switching, the combination of an optical cavity, a rotatably mounted prism forming one end of said cavity, a reflector forming the other end of said cavity, said optical cavity containing active optical maser material and a flash lamp, a lamp power supply, and a magnetic pickup in circuit with said optical cavity, said prism being supported in a prism holder which has on one side thereof a steel pin, whereby movement of said pin in proximity to said magnetic pickup generates a signal which causes said lamp power supply to ignite said flash lamp, said prism being a Porro prism, said prism holder being supported by two wires, one of said wires being fixedly secured at one end to said prism holder and at the other end to a torsion pendulum mounting frame, the other of said wires being fixedly secured at one end to said prism holder and pivotably contained at the other end in a magnetic pickup pivot ring, said magnetic pickup pivot ring being an integral part of a magnetic pickup mount which is adjustably secured in said torsion pendulum mounting frame, said magnetic pickup mount being adjustably secured to a support plate by a clamp, a trigger mount also secured to said support plate, a trigger pivotably secured to said trigger mount, said trigger having an operating end thereon and said prism holder having a projection thereon which coact to initiate rotational movement of said Porro prism.

References Cited

UNITED STATES PATENTS 3,308,396   3/1967   Comstock et al. _____ 331—94.5

OTHER REFERENCES

Electronic Design, Aug. 2, 1963, pp. 42–46. 331–94.5.

TRG publication, "TRG Model 106 Laser System," received in Patent Office Feb. 19, 1965. 331–94.5.

ROY LAKE, Primary Examiner

S. H. GRIMM, Assistant Examiner

U.S. Cl. X.R.

350—160